May 5, 1953 J. F. KANEY 2,637,197
VALVE TESTING APPARATUS
Filed June 6, 1946 2 SHEETS—SHEET 1

INVENTOR.
JOSEPH F. KANEY
BY
M. O. Hayes
ATTORNEY

May 5, 1953

J. F. KANEY 2,637,197

VALVE TESTING APPARATUS

Filed June 6, 1946

2 SHEETS—SHEET 2

INVENTOR.
JOSEPH F KANEY
BY
M O Hayes

ATTORNEY

Patented May 5, 1953

2,637,197

UNITED STATES PATENT OFFICE 2,637,197

VALVE TESTING APPARATUS

Joseph F. Kaney, Philadelphia, Pa.

Application June 6, 1946, Serial No. 674,699

2 Claims. (Cl. 73—4)

(Granted under Title 35, U. S. Code (1952), sec. 266)

The invention herein described may be manufactured and used by or for the Government of the United States of America for governmental purposes without the payment of any royalties thereon or therefor.

This invention relates to apparatus for testing relief and safety valves.

In testing relief and safety valves the shock encountered by workmen when these valves popped in the test room has been found to be dangerous to personnel near the testing apparatus. Also, when rigid connections, as threaded pipe and a closed apparatus are used, the danger exists of the apparatus failing and carrying away by the shock of the valve that is being tested popping.

This invention aims to eliminate the above disadvantages and to provide a simple, efficient testing apparatus therefor.

An object of this invention is to provide an apparatus for testing relief and safety valves which exhausts to the atmosphere at a point outside the testing room.

Another object of this invention is to provide an apparatus for testing relief and safety valves which is adjustable to accommodate various types of valves and fluid pressure sources.

Figure 1:
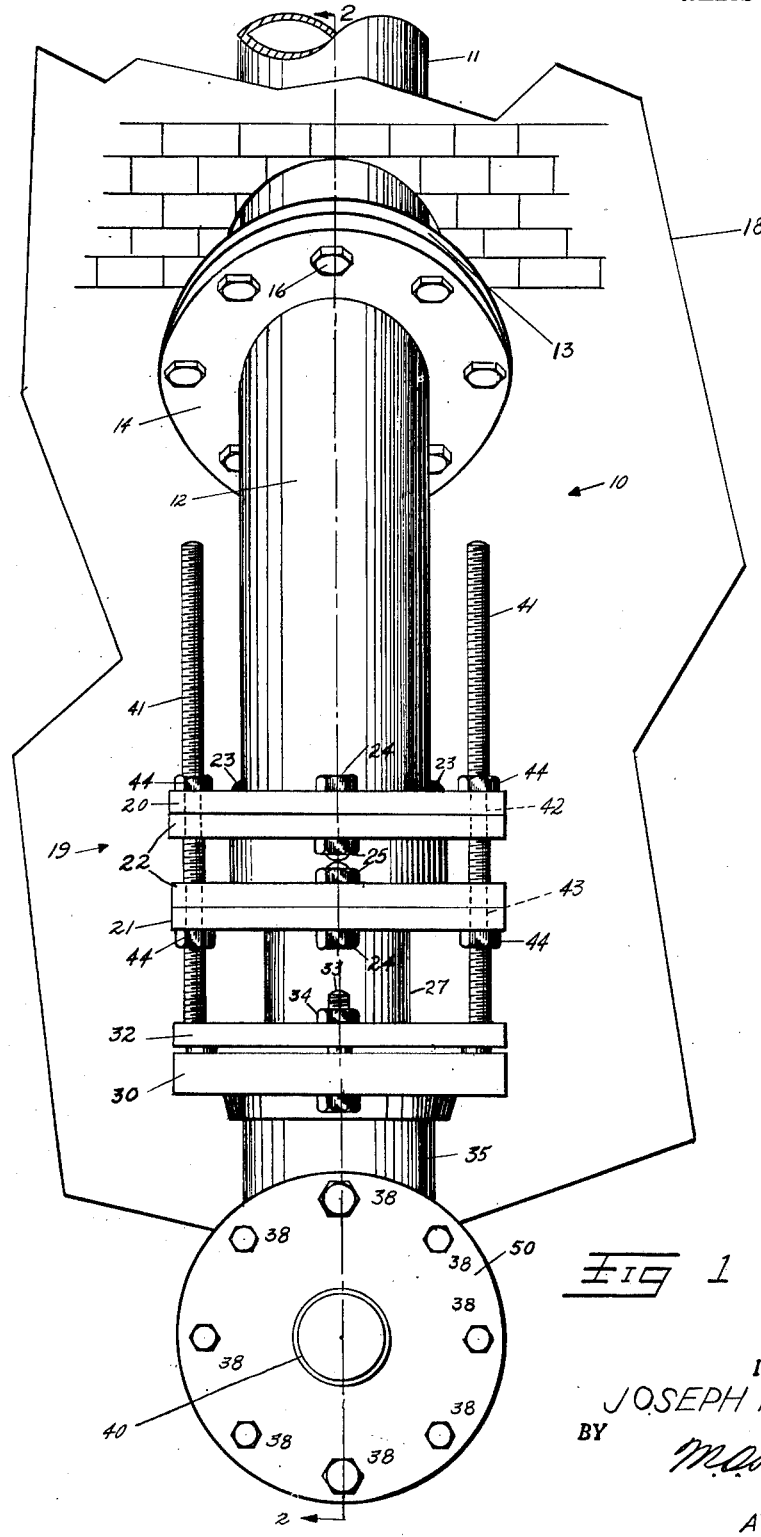
Figure 2:
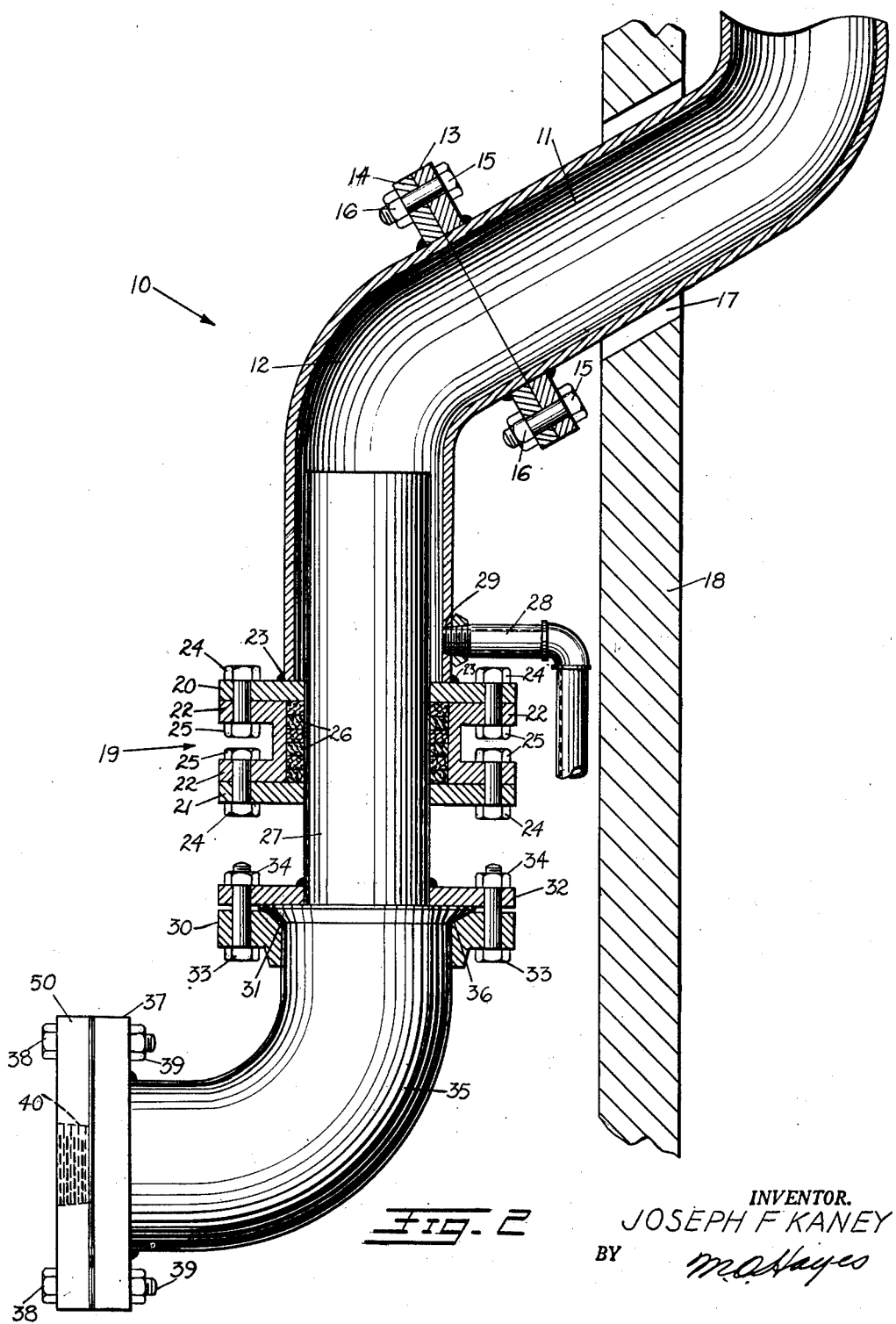

Further objects and advantages of this invention, as well as the arrangement and operation of one practical embodiment thereof, will be apparent from the following description and claims in connection with the accompanying drawing, in which:

Fig. 1 is a front elevation, showing the test apparatus embodying the present invention, and Fig. 2 is a cross-sectional elevation of the test apparatus, taken on line 2—2 of Fig. 1.

The testing apparatus of the disclosed embodiment, illustrated generally at 10, comprises the elbows 11 and 12 which are coupled to each other by means of their coupling fingers 13 and 14 respectively, and secured to each other by means of bolts 15 and nuts 16. Both elbows 11 and 12 in the disclosed embodiment are 45°. The coupling flange 13 of elbow 11 constitutes an annular disc which is secured to the end of the elbow, as shown in Fig. 2, by welding or the like suitable means. Coupling flange 14 is a similar annular disc, and is secured to its elbow 12 in a like manner.

Elbow 12, and other apparatus associated therewith which will be described more fully hereinafter, is positioned on one side of the wall 18, which may be the wall of any suitable building or chamber in which it is desired to test valves.

Elbow 11 passes through cutout 17 of wall 18 to the atmosphere outside the chamber or building in which valves are being tested.

Coupling 19 comprises the annular discs or plates 20 and 21 which are held spaced apart by the sleeve 22 positioned between them, and are secured to sleeve 22 and to each other by means of bolts 24 and nuts 25. Plate 20 is secured to elbow 12 at its end remote from elbow 11 by welding at 23 to constitute a coupling flange of elbow 12, and the members 20, 22 and 21 thus constitute the coupling 19 which is secured to the end of elbow 12 by means of the weld 23. See Fig. 2.

Tube or pipe 27 fits in the discs 20 and 21 and is inserted therein to project into the elbow 12 at its lower end. The inside diameter of sleeve 22 is greater than the inside diameters of discs 20 and 21, and packing 26 in the annular space between flanges 20 and 21 and between inside and outside surfaces of sleeve 22 and pipe 27 respectively seals the coupling 19 fluid tight between the pipe 27 and the pipe of elbow 12. Pipe 27 may thus be adjusted lengthwise into the lower end of elbow 12, the coupling 19 between the elbow 12 and pipe 27 being fluid tight for any position of adjustment.

A small drain pipe 28 is threaded into the tapped hole 29 at the lower portion of elbow 12 and just above coupling 19 to evacuate any condensate that may flow down the inside wall of elbow 12 and accumulate in the space between pipe 27 and elbow 12 on the top of disc 20.

Disc 32 is secured to the lower end of pipe 27, as seen in Fig. 2 by means of welding, and forms a coupling flange for the pipe 27. A "Van Stone" flange 30, having a beveled inner edge 31, is secured to flange disc 32 of pipe 27 by means of bolts 33 and nuts 34. Elbow 35 comprises a flared upper end 36, which is complementary to the beveled edge 31 of flange 30 to insure a snug fit. Elbow 35 is adjustable rotatably on the axis of pipe 27, and is held in adjusted position by the flange 30 being tightened towards flange 32 by means of bolts 33 and nuts 34, the coupling of flanges 30 and 32 being fluid tight by means of the flare 36 of the elbow 35 and the companion bevel 31 of flange 30.

Elbow 35 is a 90° fixture. The axis of elbow 12 below its 45° deflection extends vertically, as are also the axis of pipe 27 and the axis of 90° elbow 35 at its upper end where it is secured to pipe 27 by the coupling of flanges 30 and 32. At its lower end, the axis of elbow 35 is directed horizontally, in a direction generally away from the wall 18, as seen in Fig. 2.

At the lower end of elbow 35, the flange disc 37 constituting a coupling flange is secured to the elbow by means of welding as seen in Fig. 2. Plate 50 is secured to coupling flange 37 of elbow 35 at its extremity opposite the coupling 30, 32 by means of bolts 38 and nuts 39. Plate 50 constitutes a coupling disc by means of which a valve is coupled to the apparatus of the invention for testing, and comprises the threaded center hole 40 which is standard for receiving threads of a valve or a fitting attached thereto.

Adjustment rods 41 are suitably secured, by welding or the like means, to the coupling flange 32 of pipe 27, and project vertically upwardly and parallel with the axis of pipe 27 on opposite sides thereof. The rods 41 are projected through coupling 19, and particularly through aligned bores 42 and 43 of coupling plates 20 and 21 and the sleeve 22. The rods 41 are threaded for the nuts 44, by means of which the pipe 27 is held in position of lengthwise adjustment with reference to the elbow 12 and the coupling 19 thereof. The height of the coupling hole 40 for the valve being tested, for example above the floor of the chamber of partition 13, is thereby adjusted in accordance with the position of the valve to be tested above the floor.

The "Van Stone" flange 36 permits rotary adjustment of elbow 35 on the vertical axis of the pipe 27, and thereby enables the axis of coupling hole 40 of plate 50 to swing in a horizontal plane. The valve to be tested is thus easily coupled to the apparatus of the invention in deference to the direction that the valve projects away from the source of pressure fluid to which it is coupled towards the apparatus disclosed. Vertical adjustment of coupling hole 40 of plate 50 as desired is accomplished by traversing rods 41 of coupling disc 32 of pipe 27 vertically with reference to coupling 19 under action of the positioning nuts 44 against the discs 20 and 21 of coupling 19. The height of coupling hole 40 is thereby adjusted in conformance with the level above the floor at which the valve to be tested projects away from its source of pressure fluid. The "Van Stone" coupling 39 positions the axis of coupling hole 40 in alignment with the axis of the valve to be tested directed towards the apparatus of the invention. These vertical and rotary adjustments, of the rods 41 and "Van Stone" coupling 36 respectively, avoid the need of flexible tubing for coupling a valve to be tested to the testing apparatus of the invention.

Drain 28 will prevent any condensate from passing below coupling 19 and accumulating in elbow 35, from which it might flow towards or into the valve being tested.

To test a valve, it is coupled to any suitable source of pressure fluid, which may be water or steam under pressure, or it may be compressed air supplied by an air compressor which preferably is mounted portable to enable it to be moved to the apparatus of the present invention. The valve is coupled to plate 50 by means of threaded hole 40, and is subjected to progressively increasing pressures until the valve fails. Rupture of the valve is violent, and this is known as the "popping off." When the valve being tested reaches the popping point, the suddenly and violently decompressed pressure fluid is exhausted safely through elbow 35, and upwardly through pipe 27, and elbows 12 and 11, into the atmosphere away from the location of the personnel performing the test and outside the enclosure where the test is being made.

It is understood that various modifications and changes may be made in this invention without departing from the spirit and scope thereof as set forth in the appended claims.

What is claimed is:

1. A valve testing apparatus comprising a wall, a first pipe passing through said wall and exhausting to the atmosphere on one side of the wall, a vertically extending first elbow connected to said first pipe on the opposite side of the wall from the exhaust, a second pipe extending into said first elbow, an upper annular disc around the lower end of said first elbow, a lower annular disc about the lower end of said second pipe, a packing sleeve between said upper and lower discs, packing between said sleeve and said second pipe, a flange on the lower end of said second pipe, an annular disc connected to said flange, a second elbow rotatably connected to said annular disc, a coupling for a valve at the terminus of the second elbow away from the rotatable connection.

2. A valve testing apparatus comprising a wall, an inclined first pipe extending through said wall, the first pipe extending upwardly from the incline on one side of the wall and exhausting to the atmosphere, a first elbow connected to said first pipe on the opposite side of the wall from the exhaust and extending vertically downwardly, the major portion of said first elbow being vertically disposed, a second pipe extending into said first elbow and being spaced from the interior thereof, a first annular disc fixed to the lower end of said first elbow and coaxial therewith, the inner circumference of said first disc being in contact with said second pipe, a second annular disc below said first annular disc and coaxial therewith, the inner circumference of said second annular disc being in contact with said second pipe, a packing sleeve between said first and second annular discs and connected thereto, packing between said packing sleeve and said second pipe, a threaded bore in said first elbow above said first annular disc, a drain pipe in said threaded bore, a first flange on the lower end of said second pipe, a third annular disc fixed to said first flange coaxially, the inner circumference of said third annular disc being beveled, a second elbow, said second elbow having a flared upper end, said flared upper end being complementary to said beveled inner circumference and in rotatable engagement therewith, the lower end of said second elbow having a second flange, a fourth disc coaxially attached to said second flange, said fourth disc having a threaded bore therethrough for coupling a valve being tested into the apparatus.

JOSEPH F. KANEY.

References Cited in the file of this patent

UNITED STATES PATENTS

| Number | Name | Date |
|---|---|---|
| 943,904 | Struer | Dec. 21, 1909 |
| 1,079,350 | Kelly | Nov. 25, 1913 |
| 1,247,937 | Cumfer | Nov. 27, 1917 |
| 1,817,289 | Benz | Aug. 4, 1931 |
| 1,947,072 | Walton et al. | Feb. 13, 1934 |
| 2,013,448 | Roby | Sept. 3, 1935 |
| 2,178,901 | Webster | Nov. 7, 1939 |

FOREIGN PATENTS

| Number | Country | Date |
|---|---|---|
| 3,994 | Great Britain | Mar. 1, 1900 |